United States Patent [19]

Bloem et al.

[11] 3,892,940

[45] July 1, 1975

[54] APPARATUS FOR UNIFORMLY HEATING MONOCRYSTALLINE WAFERS

[75] Inventors: Jan Bloem, Emmasingel, Eindhoven; Antonius Hermanus Goemans, Nijmegen, both of Netherlands

[73] Assignee: U.S. Philips Corporation, New York, N.Y.

[22] Filed: June 27, 1973

[21] Appl. No.: 373,944

[30] Foreign Application Priority Data

July 1, 1972 Netherlands ........................ 7209297

[52] U.S. Cl. .......... 219/10.49; 219/10.67; 118/49.5

[51] Int. Cl. .............................................. H05b 5/08

[58] Field of Search ............... 219/10.49, 6.5, 10.41, 219/10.43, 10.67, 10.69; 118/500, 49.5; 13/1

[56] References Cited

UNITED STATES PATENTS

| | | | |
|---|---|---|---|
| 3,529,116 | 9/1970 | Miyagi | 219/10.61 |
| 3,539,759 | 11/1970 | Spiro et al. | 219/10.49 |
| 3,754,110 | 8/1973 | Von Dongen et al. | 219/10.49 |

*Primary Examiner*—Bruce A. Reynolds

*Attorney, Agent, or Firm*—Frank R. Trifari; Ronald L. Drumheller

[57] ABSTRACT

A plate-shaped susceptor for more uniformly heating monocrystalline wafers by high frequency induction wherein the susceptor is profiled on its lower side so that below the places destined for the wafers, the susceptor is thinner, resulting in less heat generation just below the central portion of the wafer to compensate for reduced heat radiation therefrom.

11 Claims, 5 Drawing Figures

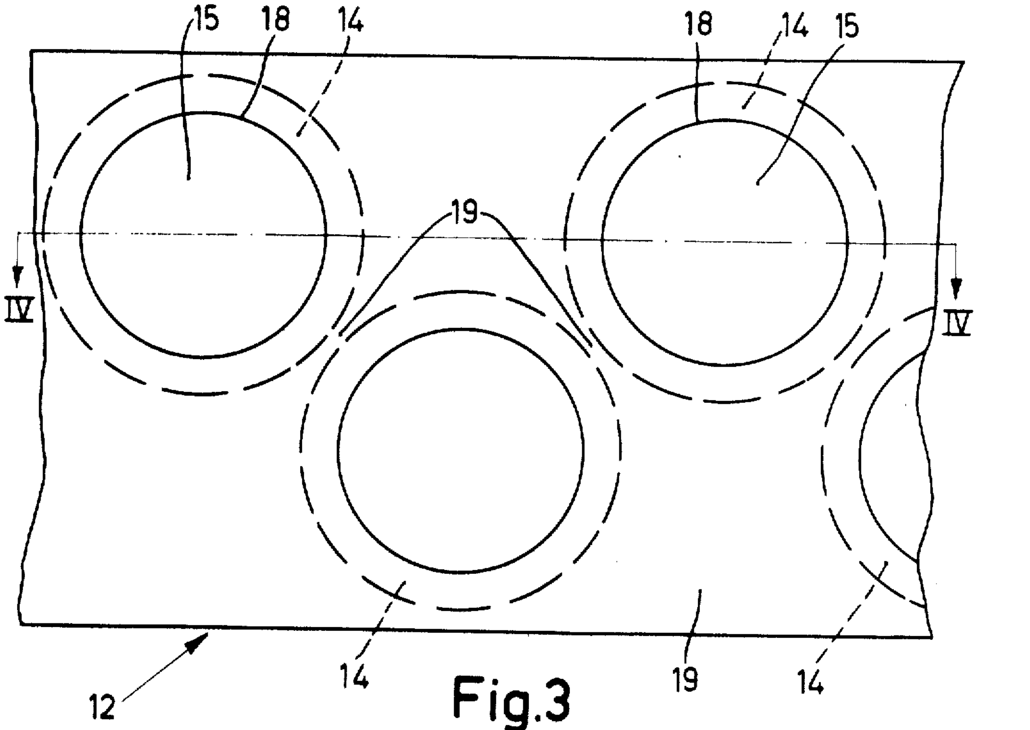
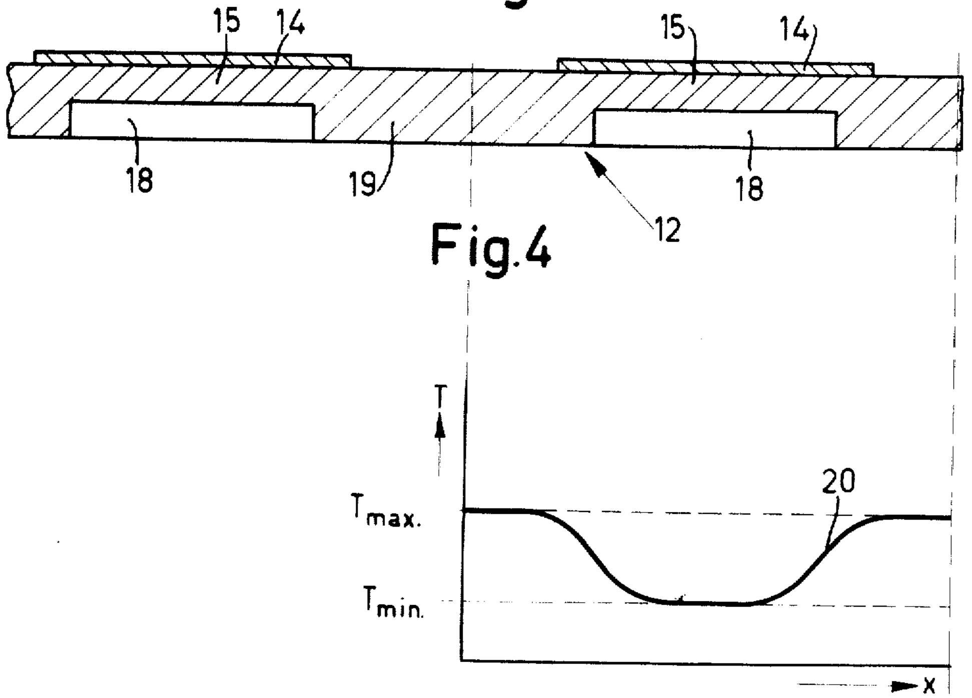
Fig.3 Fig.4 Fig.5

APPARATUS FOR UNIFORMLY HEATING MONOCRYSTALLINE WAFERS

The invention relates to a method of treating monocrystalline wafers, in which said wafers are provided with one flat side on the upper side of a plate-shaped susceptor, said susceptor being surrounded by a high-frequency coil by means of which the susceptor is heated by high-frequency induction causing eddy currents which are mutually opposite at upper and lower side of the susceptor. The invention furthermore relates to a susceptor suitable for use in such a method, a device for treating monocrystalline wafers by means of a thermal treatment with the use of such a susceptor, a monocrystalline body obtained by using the above method, and a semiconductor device having a monocrystalline semiconductor body obtained by using said method.

Such a method may be used, for example, for treating wafers of monocrystalline semiconductor materials. In practice said method is used in the epitaxial provision of a semiconductor layer on a monocrystalline semiconductor wafer, in particular an epitaxial silicon layer on a silicon wafer. However, the method may also be used for providing other layers, for example, insulating layers, for example of silicon oxide, silicon nitride, aluminium oxide and/or glasses on the basis of silicon oxide and other oxides, for example, oxides of dopings such as phosphorus or boron. A similar method may in principle also be used for the diffusion of a doping into a semiconductor.

Further, such a method may be used for epitaxially depositing a layer of a semiconductor material onto a single crystal substrate of a material of substantially different composition, for instance a substantially differently composed semiconductor material for forming a so-called hetero-junction or an insulating material, for instance a well-known single crystal substrate of sapphire or of spinel.

Also for technical purposes other than semiconductor devices, for instance, the deposition of a single crystal magnetic bubble layer onto a non-ferromagnetic single crystal substrate, in which highly perfect crystal structures are desired, such a method may, in pinciple, be used.

For carrying out such a method it is known to use a substantially horizontal elongate induction furnace having a series of substantially vertical windings and containing an elongate plate-shaped susceptor on the upper side of which the wafers to be heated are positioned and which is positioned inside the coil with its longitudinal direction substantially in direction of or inclined to the furnace axis. The susceptor consists of a suitable refractory material which has a sufficient conductivity to be able, to produce induction currents therein, for example, a susceptor of graphite.

If desirable, the surface of the susceptor may be treated in a suitable manner, for example, be provided with a surface layer of silicon carbide.

A gas may be conducted along the wafers to be treated, for example, a gas having a composition which is suitable for the deposition or formation of, for example, a desirable epitaxial layer, or only an inert gas. In particular in the case of the provision of epitaxial layers the difficulty exists of obtaining an even deposition on the wafers and in particular providing an epitaxial layer of uniform thickness on each wafer. It has therefore been endeavoured inter alia to heat the wafers as uniformly as possible. In order to achieve this it has been tried to give the susceptor surface covered with the wafers a temperature which is as uniform as possible. For that purpose it has been suggested, for example, to use thickened edge parts along the sides of the elongate susceptor.

It was also known that during the epitaxial deposition of silicon on monocrystalline silicon wafers according to the above-mentioned known method, a rather considerable increase of lattice defects in the wafer to be treated often occurred locally. As a result of such a locally disturbed crystal structure, an increase of the reject percentage may occur during subsequent process steps in the manufacture of semiconductor devices.

The above-mentioned increase of the crystal defects may be ascribed to thermal stresses as a result of temperature differences in the heated wafer. As a result of said stresses, internal shifts in the crystal structure may occur along certain crystallographic planes, in particular there where a reduced binding force is present between atoms on either side of such a plane. With such shifts, the thermal stresses at the given temperature distribution are more or less annealed. At the same time, increased concentrations of dislocations occur locally along the plane of the shift, hereinafter termed "slip-plane". The said shift phenomenon is known by the name of "slip" and may be recognized by the densely accumulated dislocations present locally according to a row in the slip plane forming a kind of pattern, termed "slip pattern". The occurrence of such phenomena is found to increase when the dimensions of the wafers increase, the said local accumulations, proceeding from the central parts of such a wafer towards the edge, also increasing.

It has been found that when using a susceptor in which considerable temperature gradients over the surface on which the wafers are provided are avoided, the slip phenomena can be considerably reduced and may even be substantially entirely absent in wafers up to given maximum dimensions. This has been found, for example, in circular silicon wafers having a diameter of approximately 38 mms or less although also with said dimensions of the wafer a further reduction of the possibility of the occurrence of slip is still desired. In the case of epitaxy on larger circular wafers of silicon, for example, having a diameter of 50 mms and more, however, slip phenomena are clearly noticeable, in particular in parts present more to the periphery of the wafer.

The invention is based on the following recognitions. In the case of indirect heating of the wafers by heat transfer from a high frequency inductively heated susceptor on which the wafers are provided, if desired coupled with a more direct heating by direct coupling of the wafers to the high-frequency electromagnetic field, the surroundings of susceptor and wafers are comparatively cold so that the wafers will start radiating thermal energy on their upper sides. As a result of this, such a wafer will tend to warp slightly. The peripheral parts will as a result be lifted slightly from the susceptor surface so that at that area the heat transfer between the susceptor and the wafer will be worse than in the parts of the wafer which are present more centrally. When in known manner on the upper side of the susceptor recesses are provided having a depth and lateral dimensions which correspond approximately to thickness and lateral dimensions of the wafers to be treated and in which recesses the wafers are laid, the increased radiation on the edge of the wafer can be mitigated, it is true, but the danger exists that the wall of the recess irradiates the edge parts of the wafer too strongly in which case slip phenomena may occur at the edge also. The correct depth of the recesses and the thickness of the wafers are very critical in this embodiment and the optimum conditions are difficult to find. As a result of this, temperature differences and consequently thermal stresses will occur in the wafer so that slip is stimulated. It will be obvious that, according as the diameter of the wafer is larger, the lifting of the susceptor at the edge parts of the wafer will be more pronounced. Furthermore, the invention is inter alia based on the idea to compensate for the temperature reducing factors in the peripheral parts by trying to obtain a temperature gradient at the susceptor surface itself in such manner that the temperature at the susceptor surface is higher below the peripheral parts of the wafer than below the central parts of the wafer. It has been found that this can be achieved with a suitable profile of the lower side of the susceptor surface. According to the invention, a method of the type described in the preamble is characterized in that the susceptor used is profiled on its lower side so that below the places destined for the monocrystalline wafers the susceptor has thinner portions the shape of which is adapted to the shape of the wafers to be heated. By this latter adaptation is meant that clearly observable correspondences in shape exist between the wafer and the thin portion. The lateral shapes of wafer and thin portion may, more generally speaking, have, for example, approximately the same form but need not necessarily be congruent. For the treatment of rectangular wafers, for example oblong wafers, thin parts of a rectangular shape will preferably also be used but the ratio length to width need not necessarily be the same for the wafer and for the thin susceptor portion, while, if desired, roundings of corners may be used in one of the two only.

Furthermore it is to be noted that the difference in thickness between thick and thin susceptor portions will in practice be larger than in general the thickness of the wafers to be treated, that is to say, larger than in known susceptors having a recess on the upper side, the depth of which approximates the thickness of the wafer. For example, the known method is generally used in semiconductor wafers, for example of silicon, having thicknesses below 500 $\mu$ ms, for example 200–300 $\mu$ ms. In the method according to the invention in which a difference in thickness is achieved by profiling the lower side of the wafer, the difference in thickness is preferably obtained by a recess on the lower side having a depth exceeding 2 times the thickness of the wafer to be treated. The temperature difference between the surface of the thinner and of the thicker portion may be ascribed to a higher lateral resistance in the thinner parts, as a result of which the strength of the induction currents per unit of cross-section in the thinner parts is lower than in the thicker parts. As a result of this, the heat generation per cm$^3$, averaged over the susceptor cross-section, is also smaller. It has been found in practice that the choice of the thicknesses of thick and thin portions can be varied within wide limits. Embodiments in which the thickness of the thin portions is at least one third and at most two thirds of the thickness, for example approximately half the thickness of the surrounding thick portions have proved to be particularly favourable.

The lateral dimensions of the thin portions are preferably not larger than approximately the corresponding lateral dimensions of the wafers to be treated. For treating circular wafers, circular thin portions are preferably used on which the wafers are preferably provided approximately coaxially. A very careful alignment is generally not required. The diameter of the circular portions is preferably not chosen to be too small, preferably at least approximately half of the diameter of the circular wafers to be treated.

When using high-frequency induction for heating the susceptor by the eddy currents produced therein, the skin effect should be taken into account in which the strength of the eddy currents decreases according to an e-power from the susceptor surface. This decrease becomes steeper when the frequency is increased and the resistivity is decreased. The current is most dense at the surface. The depth below the surface where the current strength has a value 1/$e$ times the current strength at the surface is termed the depth of penetration $\delta$ of a high-frequency magnetic field in a conductor and satisfies the formula $$\delta = 5030 \quad \rho/\mu\ f, \tag{1}$$

in which $\rho$ is the resistivity of the material of the conductor in ohm cm, $\mu$ the magnetic permeability of said material and $f$ the applied frequency in Hz, and which $\delta$ is given in cm. The magnetic permeability for a non-magnetisable material, for example, graphite, may be assumed to be equal to 1. When the axis of a high-frequency coil provided around a plate-shaped susceptor is present more or less parallel to the flat sides of the plate-shaped susceptor, eddy currents will flow on the upper and lower sides when energizing the coil, which currents are directed opposite to each other. When in the case of a given frequency the wafer thickness is 6×the depth of penetration, the two currents will hardly influence each other. With a wafer thickness of 4×the depth of penetration, the mutual hindrance of the currents on either side of the wafer is still so small that this need not normally be taken into account in practice. Below this value the currents begin to hinder each other significantly and a reduced coupling occurs between the coil and the plate, which reduction becomes stronger according as the wafer becomes thinner. In order to obtain a lower temperature at the surface of the thinner portions than at the surface of the thicker portions, when using the plate-shaped susceptor with thicker and thinner portions in the method according to the invention, the composition and proportions of the susceptor and the applied frequency are preferably chosen to be so that the thickness of the thin portions is smaller than 4 times the depth of penetration. When a plate-shaped susceptor of graphite and a frequency of 500 kHz are used, the depth of penetration may be approximated with formula I. Dependent upon the structure of the graphite, the resistivity may be different but generally lies between about 1000 and 3000 $\mu\Omega$ cm but will still increase upon heating. In casae of a resistivity of 2000 $\mu\Omega$ cm and a frequency of approximately 500 Hz, the depth of penetration will be 5030 $\quad 2\times10^{-3}/5\times10^{5}=3.2\times10^{-1}$ cm, that is to say well over 3 mm. The thin portions of the susceptor should in that case preferably be thinner than well over 12 mm of graphite.

It is recommendable to choose the susceptor to be not too thin so as to obtain a reasonable coupling to the coil, preferably at least 2 times the depth of penetration as regards the thick portions of the susceptor. When the thin portions are given very small thicknesses, the coupling to the high frequency coil becomes low and strongly dependent upon said thickness, as a result of which the temperature difference at the succeptor surface can become so large that the central portions of the wafer could obtain too low a temperature relative to the peripheral portions. Furthermore, the conditions become more critical as a result of which the reproducibility may decrease. Therefore, the conditions are preferably chosen to be so that the thickness of the thin portions is at least 1×the depth of penetration.

The method is preferably used in depositing layers from the gaseous phase on monocrystalline wafers, for example, of semiconductor material. It is possible to heat the supplied gas comparatively only little until it has arrived close to the susceptor, so that the required temperature of the gas for the deposition is achieved only in the immediate proximity of the susceptor. In particular, epitaxial layers of high quality can be provided in this manner on monocrystalline wafers, preferably dislocation-free wafers, while maintaining the quality of said wafers also in the case of comparatively large lateral dimensions of the wafers. Therefore, the invention is particularly advantageous when treating monocrystalline semiconductor wafers. The invention which also extends to wafers treated by using the method according to the invention is, for the abovementioned reasons, of particular interest in manufacturing semiconductor devices. The invention therefore also comprises a semiconductor device having a monocrystalline semiconductor body obtained by using the method according to the invention. The invention furthermore extends to a susceptor which is suitable for use in the method according to the invention and to a device for treating monocrystalline wafers by heating on a susceptor according to the invention which can be heated inductively by means of a surrounding high-frequency coil, the flat upper side of the susceptor being positioned substantially parallel to or inclined with respect to the axis of the high-frequency coil.

The invention will be described in greater detail with reference to the accompanying drawing.

FIG. 3 is a diagrammatic underneath view of a detail of an embodiment of a susceptor for use in a construction of the method according to the invention, FIG. 4 is a diagrammatic vertical cross-sectional view of the detail of the susceptor shown in FIG. 3.

FIG. 5 shows diagrammatically a graph in which the temperature distribution over a part of the upper surface of the susceptor shown in FIG. 4 is plotted.

Figure 1:
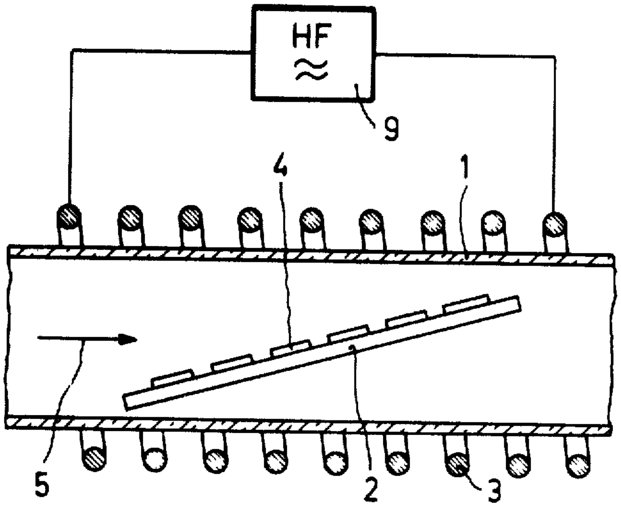
FIG. 1 is a diagrammatic vertical cross-sectional view of an example of a device for treating monocrystalline wafers on a susceptor heated by high-frequency induction.

In FIG. 1, 1 denotes a reactor tube, for example consisting of quartz glass, substantially coaxial around which a high-frequency coil 3 is present which is supplied by a high-frequency generator 9. By suitable supporting means consisting of insulating material, for example, quartz glass (not shown in FIG. 1) an elongate, plate-shaped susceptor 2 is placed in the tube 1 in such manner that said susceptor is located within the high-frequency coil 3. With respect to the axis of the tube 1 the susceptor 2 is provided in an inclined position of a few degrees as is shown diagrammatically in FIG. 1 in an exaggerated manner. A series of wafers 4 of monocrystalline silicon are placed on the susceptor 2. A gas is conveyed through the tube 1 in the direction of the arrow denoted by 5. The gas is, for example, pure hydrogen. The high-frequency coil 3 is energized by high-frequency generator 9. By coupling to the field of the coil, the susceptor 2 is heated in known manner to approximately the desired temperature, for example, for the epitaxial provision of a silicon layer on the wafers 4. Said desired temperature is, for example, approximately 1200°C for deposition from silicon tetrachloride. When the desired temperature is approximately set, vapour of silicon tetrachloride is supplied in known manner to the hydrogen, the epitaxial silicon layer being deposited on the wafers 4. After a time which is sufficient to obtain the desired layer thickness, again pure hydrogen only is passed through and then the assembly is cooled down.

Figure 2:
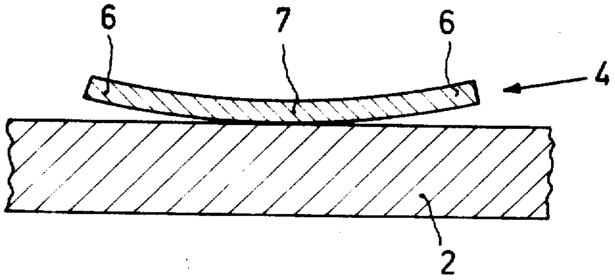
FIG. 2 is a diagrammatic vertical cross-sectional view of a detail of a portion of a susceptor of known type having a wafer heated thereon.

When using a plate-shaped susceptor 2 of graphite of a known model of uniform thickness, the silicon wafers 4 may warp as is shown diagrammatically. in FIG. 2 in an exaggerated manner. The peripheral parts 6 of such a wafer 4 are lifted from the susceptor surface in such manner, for example, the edges of a circular wafer having a thickness of 250 microns and a diameter of approximately 59 mms are lifted up to a distance of approximately 50 to 100 microns from the susceptor surface, that the peripheral parts 6 obtain a lower temperature than the central parts 7 which bear on the susceptor surface or are only slightly lifted. As a result of the occurred thermal stresses, much slip may have occurred, in particular with wafer diameters of at least about 40 mms, for example, 50 mms or more, also when dislocation-free wafers are used which are carefully pretreated. With such wafers having a diameter of approximately 5 cms experiments have proved, that only about 45 percent of the wafer was slip-free. "Slip-free percentage" is to be understood to mean herein the area of the circular part of the wafer measured from the centre which is substantially free from the above-mentioned slip phenomena divided by the entire wafer area times one hundred.

FIGS. 3 and 4 show an embodiment of a plate-shaped susceptor according to the invention which is destined for circular wafers having a diameter of approximately 50 mms. Said susceptor 12 consists of graphite and has a thickness of 10 mms in which circular recesses 18 are provided on the lower side with a depth of 5 mms. As a result of this the susceptor 12 has thin portions 15 with a thickness of 5 mms, laterally surrounded by thicker portions 19 having a thickness of 10 mms. The diameter of the recesses 18 is 40 mms and the centre distance between most adjacent recesses is, for example, 55 mms. The susceptor 12 is placed in a reactor for epitaxial deposition of a type as is shown diagrammatically in FIG. 1 and having its side in which the recesses 18 are provided lowermost. On the oppositely located upward side, circular silicon wafers 14 having a diameter of approximately 50 mms and a thickness of approximately 250 microns are provided approximately coaxially with the recesses 18 and the thin portions 15. The wafers 14 were dislocation-free and their surface was carefully pretreated in the usual manner in which the surface parts placed on the susceptor had been subjected to a cleaning and polishing etching treatment so as to remove surface defects. The wafers were heated at approximately 1200°C while using high-frequency inductive heating of the susceptor with a frequency of 450 kHz. With a reaction gas consisting in known manner of pure hydrogen with vapour of silicon tetrachloride, an epitaxial silicon layer was deposited on the wafers 14. Examination proved that the wafers were slip-free for ar least 90 percent and some wafers were even entirely slip-free.

FIG. 5 shows diagrammatically the temperature variation of the susceptor surface measured at approximately 1200°C in the absence of the wafers 14, in which the susceptor was likewise heated by high-frequency induction in a reactor of the type shown in FIG. 1 at a frequency of 450 kHz. Plotted on the abscissa is the distance $x$ over the upper surface of the susceptor along a part of the line IV—IV of FIG. 3 over the cross-section shown in FIG. 4 and proceeding centrally across a portion 15 having a smaller thickness. The temperature is plotted diagrammatically on the ordinate. The curve 20 shows diagrammatically the temperature variation across the susceptor surface in which, proceeding from left to right in the graph, the temperature, from a point of the surface of a thicker portion 19 at some distance from a thinner portion 13, gradually decreases from a temperature $T_{max}$ of higher value to a temperature minimum $T_{min}$ centrally on the portion 15. The temperature difference between $T_{max}$ and $T_{min}$ is, for example, approximately 20°–30°C, which is sufficient for a reasonable compensation of the stronger cooling of the peripheral parts of the wafers 14 relative to the cooling of the central parts of the wafer. Corresponding results for checking slip in similar treatments of silicon wafers were obtained with larger susceptor thicknesses at the same frequency, for example, susceptors from the same graphite and having the same lateral proportioning but a thickness of 160 mms of the thick portions 19 and a thickness of 80 mms for the thin portions 15. Thickness ratios between portions 19 and 15 deviating from 2:1 turned out to be useful also. Furthermore, more gradual, for example conical, transitions between thin and thick portions have also been used successfully.

What is claimed is:

1. A susceptor for heating to a uniform temperature in a high frequency field monocrystalline wafers of a selected geometrical shape and size, comprising a body having two opposed major surfaces, one major surface having spaced recesses of geometrical shape and size similar to the selected geometrical shape and size of said monocrystalline wafers, said recesses effectively decreasing the heat generated by said field in said body in the thinner regions between said recesses and the other major surface thereof, whereby wafers of said selected geometrical shape and size positioned on said other major surface and aligned with said recesses are heated less in the central areas thereof to compensate for reduced heat radiation from said areas resulting in a more substantially homogeneous temperature distribution in said wafers.

2. A susceptor as defined in claim 1 wherein the depth of said recesses is no more than two thirds the thickness of said body.

3. A susceptor as defined in claim 2 wherein the depth of said recesses is no less than one third the thickness of said body.

4. A susceptor as defined in claim 3 wherein the depth of said recesses is at least twice the thickness of the selected wafers.

5. A susceptor as defined in claim 1 wherein the lateral dimensions of said recesses are no greater than the lateral dimensions of the selected wafers.

6. A susceptor as defined in claim 1 wherein said selected geometrical shape is circular and said recesses are circular.

7. A susceptor as defined in claim 6 wherein the diameter of said recesses is greater than one half and no more than equal to the diameter of the selected wafers.

8. A susceptor as defined in claim 1 wherein said thinner regions between said recesses and the other major surface of said body have a thickness no greater than four times the depth of penetration of the high frequency field in the body material.

9. A susceptor as defined in claim 8 wherein said thinner regions have a thickness of at least the depth of penetration of the high frequency field in the body material.

10. A susceptor as defined in claim 1 wherein said body has a thickness in regions other than said thinner regions of at least twice the depth of penetration of the high frequency field in the body material.

11. A susceptor as defined in claim 1 of material comprising graphite.

* * * * *